United States Patent [19]
Heilhecker et al.

[11] 3,766,997
[45] Oct. 23, 1973

[54] METHOD AND APPARATUS FOR TREATING A DRILLING FLUID

[75] Inventors: Joe K. Heilhecker, Bellaire; Leon H. Robinson, Houston, both of Tex.

[73] Assignee: Esso Production Research Company, Houston, Tex.

[22] Filed: Mar. 2, 1973

[21] Appl. No.: 337,617

Related U.S. Application Data

[63] Continuation of Ser. No. 209,719, Dec. 20, 1971, abandoned.

[52] U.S. Cl. ................................ 175/66, 175/206
[51] Int. Cl. ........................................... E21b 21/00
[58] Field of Search ................... 175/66, 206, 207; 209/11, 12

[56] References Cited
UNITED STATES PATENTS

| | | | |
|---|---|---|---|
| 2,156,333 | 5/1939 | Cross et al. | 175/66 |
| 2,225,973 | 12/1940 | Brown et al. | 175/66 X |
| 2,576,283 | 11/1951 | Chaney | 175/66 |
| 2,919,898 | 1/1960 | Marwel et al. | 175/66 |
| 2,923,151 | 2/1960 | Engle et al. | 175/206 X |
| 2,941,783 | 6/1960 | Stinson | 175/66 X |
| 3,289,775 | 12/1966 | Stone | 175/66 |
| 3,399,739 | 9/1968 | Goodwin et al. | 175/66 X |
| 3,433,312 | 3/1969 | Burdyn et al. | 175/66 |
| 3,684,038 | 8/1972 | Nelson | 175/66 |
| 3,664,440 | 5/1972 | Elenburg | 175/66 |

Primary Examiner—David H. Brown
Attorney—James A. Reilly et al.

[57] ABSTRACT

A system for treating a drilling fluid being circulated in a well and containing a fine sized particulate weighting material and drilled solids wherein the drilling fluid is passed through a first vibrating screen which removes a portion of the drilled solids and then through centrifugal separating means to separate the drilling fluid into a low-density effluent and into a high-density underflow slurry; the effluent is returned to the drilling fluid system and the underflow slurry is further processed through a second vibrating screen. The second vibrating screen is substantially finer than the first vibrating screen and functions to remove additional drilled solids. Material passing the second vibrating screen which include most of the weighting material in the underflow slurry is returned to the drilling fluid system.

21 Claims, 2 Drawing Figures

PATENTED OCT 23 1973　　3,766,997

INVENTORS
JOE K. HEILHECKER
LEON H. ROBINSON
BY Robert L. Graham
ATTORNEY

METHOD AND APPARATUS FOR TREATING A DRILLING FLUID

This a continuation, of application Ser. No. 209,719, filed Dec. 20, 1971, now abandoned.

BACKGROUND OF THE INVENTION

1. Field of the Invention

This invention relates to the treatment of a drilling fluid being circulated in a borehole. In one aspect, it relates to a method and apparatus for removing drilled solids from a drilling fluid being used in a well drilling operation and which has been returned to the surface from a bore-hole.

2. Description of the Prior Art

In the drilling of oil wells, gas wells, and similar boreholes by rotary drilling techniques, a drilling fluid is continuously circulated from the surface through the drill string and returned to the surface. The drilling fluid, referred to as "mud" serves several functions, the most important of which includes cooling and lubricating the bit, forming a filter cake on the borehole wall, removing drilled solids from the borehole, and controlling formation pressure. In order for the drilling fluid to perform these several functions, its viscosity, density, and filter loss characteristics as well as other properties must be maintained within acceptable limits. A major problem in such maintenance is that of controlling the concentration of drilled solids in the fluid. Drilled solids enter the circulating fluid as bit cuttings or formation cavings. If permitted to accumulate in the system, these solids adversely affect several important properties of the fluid. For example, it is known that drilled solids increase the viscosity and density of the fluid, reduce the carrying capacity of the fluid, promote poor filter cake qualities, and damage drilling equipment.

For unweighted drilling fluids, i.e. those containing no weighting material, solids control is achieved by use of a variety of vibrating screens or centrifugal separators such as hydrocyclones and centrifuges. A technique commonly employed in the control of solids in unweighted drilling fluid is to pass the fluid first through a vibrating screen known as a shale shaker to remove the large size particles and then through a plurality of hydrocyclones connected in parallel to remove smaller size particles. The drilling fluid passing both the shale shaker and the hydrocyclones is returned to the system and the solids removed by these devices are discarded. Most of the liquid phase and additives in the drilling fluid are recovered by this process while substantial amounts of drilled solids are removed.

This technique, however, is normally not used to treat a drilling fluid containing a weighting material such as barite because substantial amounts of such materials would be discarded along with other solids rejected by the hydrocyclones. Drilled solids in a weighted drilling fluid are therefore normally permitted to accumulate in the fluid system. The adverse effects of these solids can be minimized by the addition of certain chemical thinners such as lignites, lignosulphonates, phosphates, quebracho, and the like. However, above certain solids concentrations, the thinners are no longer effective. When this occurs, the drilling fluid must be treated to reduce the concentration of the drilled solids or at least to maintain the concentration within acceptable limits. This can be achieved by dilution with a liquid such as water in a water-base fluid or oil in an oil-base fluid, or by the use of mechanical devices designed to remove unwanted solids from the fluid system.

The reduction of solids concentration by dilution requires the addition of large quantities of liquid, which, in turn, requires additional weighting material and other additives used in the system. However, the excess volume of fluid resulting from the dilution frequently presents storage or disposal problems. Where the value of the drilling fluid is high, or where disposal is not possible, efforts are generally made to minimize the amount of liquid dilution. This normally entails the use of the mechanical devices referred to above. One technique commonly used with water-base fluids involves passing a portion of the drilling fluid through a centrifugal separator which separates the drilling fluid into a low-density effluent and a high-density underflow slurry. The effluent containing most of the liquid, chemicals, and colloidal sized solids is discarded while the underflow slurry containing weighting material and drilled solids is recovered and reintroduced into the drilling fluid system. Although the centrifuging technique has proven effective in the recovery of barite, it has certain disadvantages which seriously limit its application. The technique, as normally applied, inherently results in the loss of valuable materials contained in the low-density effluent. These materials include substantially all of the liquid phase of the drilling fluid and, except for the barite, essentially all of the fluid additives. In order to compensate for the loss of these materials, additional liquid and additives must be introduced into the system which adds appreciably to the total cost of the drilling fluid. Moreover, the centrifuging technique is normally not employed where the value of the liquid phase and additives exceeds that of the recoverable weighting material, as for example in oil-base drilling fluids.

Another disadvantage of the centrifuging technique, as normally applied in the treatment of weighted drilling fluids, is that of reintroducing solids into the fluid system. The underflow slurry from the centrifugal separator contains substantial quantities of drilled solids along with the weighting material. These unwanted solids are reintroduced into the system along with the recovered weighting material.

It is thus seen that the most commonly employed technique for removing drilled solids from a weighted drilling fluid is merely a corrective measure resorted to only after the solids concentration has reached a relatively high level in the drilling fluid.

SUMMARY OF THE INVENTION

The present invention provides an improved system for controlling the concentration of drilled solids in a weighted drilling fluid. In contrast to conventional treating techniques which normally are employed only after the solids content has reached an undesirable level, the present invention can be employed at an early stage in the drilling operation to prevent the accumulation of drilled solids in the fluid system. The method overcomes many of the disadvantages associated with prior art techniques. Specifically, the method is capable of recovering substantially all of the weighting material as well as other valuable additives; it can be used to treat the entire fluid stream; it reduces the amount of drilled solids returned to the fluid system; and it can be used to treat any type of drilling fluid including water-base, oil-base, or emulsified fluids.

Briefly, the method comprises the steps of passing a drilling fluid containing a weighting material and drilled solids through a first vibrating screen to remove large size particles and then through centrifugal separating means to separate the fluid into a low-density effluent and a high-density underflow slurry; returning the low-density effluent to the drilling fluid system; screening the underflow slurry with a second vibrating screen to remove additional drilled solids; and returning the underflow slurry passing the second vibrating screen to the drilling fluid system. The second vibrating screen is substantially finer than the first vibrating screen so that some of the drilled solids which pass the first vibrating screen are screened out by the second vibrating screen. Tests have shown that most of the weighting material passes both screens and is returned to the drilling fluid whereas substantial amounts of drilled solids are screened out at each of the screening stages and are discarded. The method may also include the step of washing the material screened out by the second vibrating screen to further improve the recovery of the weighting material.

The centrifugal separating means can be provided by any of the centrifugal devices currently used in the treatment of drilling fluid but preferably is one or more hydrocyclones capable of classifying and separating most of the sand size solids, i.e., solids having a particle size greater than 74 microns.

The sizes of the screens will depend upon several factors including the size distribution of the drilled solids, the capacity and efficiency of the type of screen employed, and the properties of fluid being screened. As used herein, the term "screen size" or "opening size" refers to the size of the apertures in the screen. Screen sizes may be expressed by aperture dimensions or by mesh size. There are a number of mesh standards used to specify screen sizes including the Tyler Standard, the U.S. Standard, the British Standard, and the Institution of Mining and Metallurgy Standard. Although any of these screen designations may be used, the screen sizes specified herein are based on the U.S. Standard Sieve Series.

The opening size of the first vibrating screen must be sufficiently large to accommodate the entire fluid stream flowing at circulation rates. This normally requires a mesh size between about 10 and 100 mesh. As mentioned previously, the second vibrating screen must be substantially finer than the first vibrating screen. It must be fine enough to screen out additional drilled solids but should normally have a mesh size of about 100 mesh or finer and, preferably, between about 100 and about 325 mesh.

DESCRIPTION OF THE PREFERRED EMBODIMENTS

Figure 1:
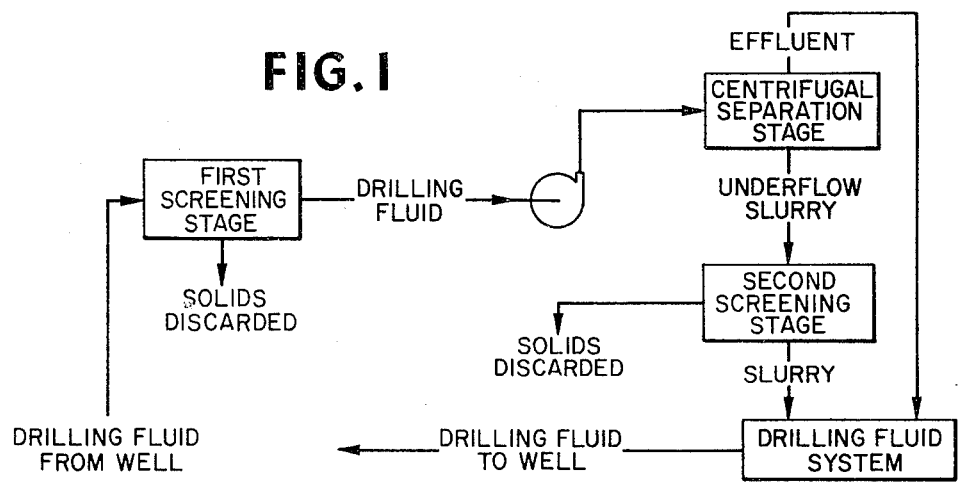
FIG. 1 is a flow diagram of the method of the present invention.

One of the most expensive aspects of treating drilling fluid is the cost of counteracting the effects of drilled solids on fluid properties. Drilled solids normally enter the drilling fluid as relatively large particles but due to mechanical and chemical effects degrade into silt or clay size particles. Such small particles cannot be removed by conventional drilling fluid screens, i.e. shale shakers, and if permitted to accumulate in the system will reach a concentration such that the fluid properties are adversely affected. To combat these adverse effects, the drilling fluid normally is treated for solids removal. Solids removal is complicated when weighted drilling fluids are used because of the presence of barite or other weighting material in the drilling fluid system. These materials frequently account for the major cost of the entire system. Ideally, solids removal should be achieved without the loss of substantial amounts of the weighting material or other valuable fluid additives.

Weighted fluids of the water-base type used in drilling operations normally consist of an aqueous suspension of three types of solids having different particle sizes. These solids include reactive clays such as bentonite, a weighting material such as barite, and drilled solids. Bentonite is the principal component used for imparting the desired viscosity to a water-base fluid and has a particle size less than 1 micron. Barite is used to impart the desired weight to the drilling fluid and in accordance with American Petroleum Institute specification has a particle size range between 0 and 200 microns with at least 97 percent by weight being passable through a 200 mesh screen. In a good quality barite, most of the particles will have a size between about 2 and 60 microns. The particle size of the drilled solids will vary within a wide range depending upon the type of bit being used, the type of formation being drilled, and upon the degree of mechanical and chemical degradation it has experienced. Particles as small as 1 micron and as large as several thousands of microns are not uncommon. The drilled solids and bentonite have a specific gravity of about 2.6 whereas barite has a specific gravity of about 4.2. It is thus seen that the density of the drilling fluid is principally due to the presence of barite. It should be noted that barite is also used as the weighting material for other types of drilling fluids including polymeric water-base fluids, oil-base fluids, and emulsion fluids.

The solids in a drilling fluid may also be classified according to their particle size. Particles greater than 74 microns are classified as sand, particles between 2 and 74 microns as silt, and particles less than 2 microns as clay. Applying this classification to the three types of solids described above, barite consists principally of silt size particles, bentonite of clay size particles, and drilled solids of a mixture of all three classes. Thus, it is seen that the size distribution of the drilled solids overlaps those of bentonite and barite. Because of this overlapping relationship of the particle sizes, it is impossible to remove all of the unwanted drilled solids while recovering all of the valuable components. In practice, efforts are generally made to remove as much of the drilled solids as possible without loss of appreciable amounts of the valuable components. As noted previously, the prior art techniques commonly employed for removal of solids from weighted drilling fluids are not particularly successful in this regard because substantial amounts of valuable fluid components and additives are lost.

Although there is an overlap of the size distribution of the three types of solids contained in the water-base drilling fluid, the majority of the particles of each type of solids normally fall into a different size distribution range. In accordance with this invention, it has been found that substantial amounts of the sand size and silt size drilled solids can be removed from the drilling fluid system while minimizing the loss of barite and other valuable additives.

The present invention will be described generally with reference to the flow diagram of FIG. 1, and more specifically, with reference to the apparatus disclosed in FIG. 2.

A drilling fluid which can be a water-base, oil-base, or emulsified fluid is withdrawn from a well being drilled and passed through a first screening stage where large particles of drilled solids are screened out and discarded. The particle size of these solids will depend upon the mesh size of the screen employed which will normally be between about 10 and 100 mesh. The drilling fluid flowing through the first screening stage is then passed through a centrifugal separation stage for further separation of solids. In this stage, the fluid is centrifugally separated into a low-density effluent and a high-density underflow slurry. The effluent containing substantially all of the bentonite, if used, and substantial quantities of barite is returned to the drilling fluid system. Depending upon their particle size, drilled solids may also be present in the effluent. The amount of drilled solids in the effluent may be minimized by employing the method of the present invention at a very early stage in the drilling operation. This will result in early removal of large size drilled solids and thus prevent them from being mechanically degraded to silt or clay size which are extremely difficult to separate. The underflow slurry consisting principally of barite and drilled solids is further processed through a second screening stage. In this stage, additional drilled solids are screened out and discarded while most of the barite is passed and returned to the fluid system. Tests have shown that a major volume proportion of the drilled solids contained in the underflow slurry are removed from the fluid by the second screening stage.

The centrifugal separation stage can be performed by any of the centrifugal separators currently used in the treatment of drilling fluids. These include hydrocyclones, frequently called desanders and desilters, and centrifuges. Hydrocyclones are preferred, however, because they discharge a slurry which can be readily screened by the second screening stage. Moreover, hydrocyclones are normally used to treat the drilling fluid at well circulation rates whereas centrifuges are normally used to treat only a portion of the drilling fluid. It is preferred that the entire drilling fluid flowing at circulation rates be treated in order to remove drilled solids as soon as possible. A sufficient number of the hydrocyclones should be provided to accommodate at least the entire drilling fluid circulating at normal rates. The removal of the large size drilled solids by the first screening stage permits the centrifugal separators to be operated more efficiently. Large size drilled solids tend to plug the centrifugal separators, particularly hydrocyclones.

The screens for performing the first and second screening stages are vibrating type screens, referred to hereafter as first and second vibrating screens, respectively. As used herein, a vibrating screen is one in which a periodic motion or oscillation at a given frequency is imparted to the screen. Depending upon the screen structure, the motion may be reciprocal, gyrating, circular, spiral, combinations of these, or other special action. As mentioned previously, the second vibrating screen must be substantially finer than the first vibrating screen. The mesh size of the second vibrating screen preferably is between 100 and 325 mesh. It should be noted that since the underflow slurry represents only a fraction of the total fluid stream, the size of the second vibrating screen can be much finer than that possible if the entire stream were being treated by the second vibrating screen. Tests using 100 mesh, 140 mesh, and 200 mesh screens have shown that substantial quantities of drilled solids can be removed at the second screening stage while at the same time only negligible amounts of barite are lost.

The following table shows the preferred size ranges of the first and second vibrating screens designated by four standards.

|  | Approximate aperture size range (microns) | U.S. standard (mesh range) | Tyler standard (mesh range) | British standard (mesh range) | Institution of Mining and Metallurgy standard (mesh range) |
|---|---|---|---|---|---|
| First vibrating screen | 150–2000 | 10–100 | 9–100 | 8–100 | 8–90 |
| Second vibrating screen | 44–150 | 100–325 | 100–325 | 100–300 | 90–200 |

The screening process in the second stage screen can be improved by providing a spray system for washing the solids collected on the screen. The smaller particles of barite sometimes adhere to the larger drilled solids particles collected on the screen. By washing the materials screened out with a wash liquid or drilling fluid, the amount of barite lost can be reduced.

The effluent from the centrifugal separator or separators and from that portion of the underflow slurry passing the second vibrating screen are returned to the drilling fluid system. Alternatively, the portion of the underflow slurry passing the second vibrating screen and effluent or portions thereof can be stored and reintroduced into the system as desired.

Figure 2:
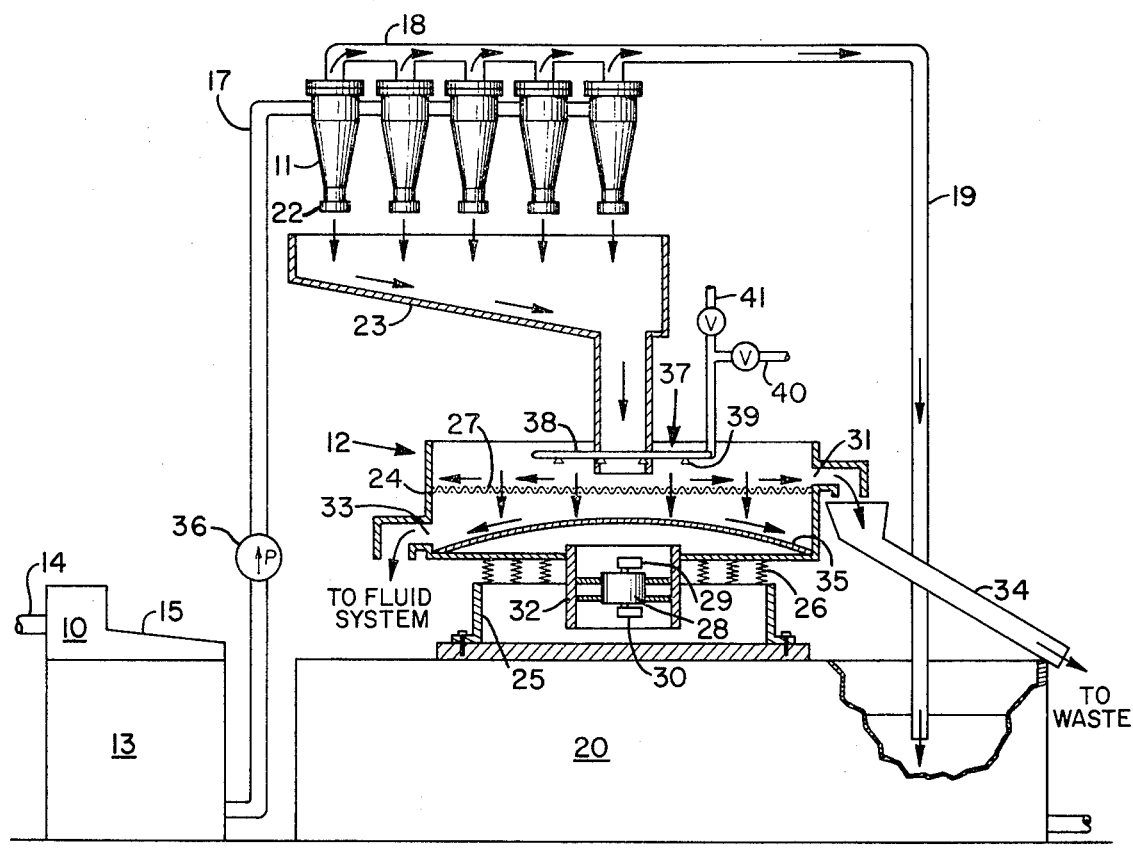
FIG. 2 is a schematic drawing showing a preferred embodiment of the apparatus of the present invention.

The three-stage treatment of drilling fluid in accordance with the present invention can be performed by the system illustrated in FIG. 2. The system comprises basically three main components: a first vibrating screen 10, centrifugal separating means 11, and a second vibrating screen 12. These components are adapted to be installed in a conventional drilling system which may be very complex including several surface tanks and a variety of fluid treating devices, or it may be very simple comprising a minimum of surface tanks and treating equipment. Drilling fluid pumps, usually of the duplex, double-acting, reciprocating type, as used to circulate drilling fluid from the surface through the drill string in the well, up the well annulus, and finally back to the surface. These pumps and the manner in which they are used to circulate the fluid in the well are well known and therefore will not be discussed further.

As indicated previously, the first vibrating screen 10 will normally be provided by a conventional shale shaker having a screen size between about 10 and 100 mesh. The screen size should be as small as possible but because of the tendency of fine screens to blind, sizes finer than 80 mesh are seldom used. As shown in FIG. 2, the first vibrating screen is positioned over a tank 13 of the fluid system and is connected to the well head (not shown) by line 14. A tilted screening deck 15 is vibrated by conventional mechanisms (not shown). Drilling fluid from the well enters the vibrating screen frame, passes through the screen deck 15 which separates large size particles and gravitates into tank 13. The particles screened out on the deck are discharged into a waste pit (not shown).

The centrifugal separating means 11 illustrated in the drawing comprises a plurality of small-diameter hydrocyclones connected in parallel. These devices are cone-shaped shells and are referred to as desilters or desanders depending upon the diameter of the cones. Each of the cones are provided with an overflow outlet (vortex) through which passes the effluent, and with a small opening at the cone apex through which passes the underflow slurry. The hydrocyclones 11 are connected in parallel by conduit 17 which extends from tank 13 and provides individual inlet lines (not shown) for each of the hydrocyclones 11. The inlet lines introduce drilling fluid tangentially into each of the hydrocyclones 11. The tangential velocity of the fluid entering each hydrocyclone 11 establishes a centrifugal force field. The fluid spirals down towards the cone apex against the conical wall of the device and spirals back upward thorugh the center of the cone and discharges out the overflow opening as a low-density effluent. The centrifugal force imparted by the spiral motion forces solids outwardly against the cone walls where they gravitate and exit through the underflow outlet at the apex.

The overflow or effluent from each hydrocyclone 11 is collected in a header 18, flowed through conduit 19, and discharged into the fluid system tank 20. The apex of each hydrocyclone 11 is provided with an adjustment nut 22 for controlling the rate of discharge of the underflow slurry. Normally, from eight to 16 of the small-diameter hydrocyclones, i.e. desilters, are required to treat the full circulation rate of the fluid. The larger diameter hydrocyclones, i.e. desanders, have a higher fluid capacity rating than the small-diameter cones and while less of these units would be required to treat the entire flow, they do not provide as complete a separation of solids as do the small-diameter cones. It is preferred that the hydrocyclones 11 have a cone diameter of 6 inches or less, and preferably of 4 inches or less.

The underflow slurry from each of the hydrocyclones 11 is collected in trough 23 and, by gravity flow, is discharged into the underlying second vibrating screen 12. The specific second vibrating screen 12 schematically depicted in FIG. 2 is a vibrating screen separator manufactured by SWECO, Inc. This device comprises a frame 24 mounted on a stationary base 25 by means of a plurality of spring 26; a screen 27 disposed internally of the frame 24; and means for imparting vibrational movement to the frame 24 and screen 27. The SWECO separator employs a circular frame containing a circular screen and is provided with a motor 28 having eccentric weights 29 and 30 for imparting the vibrational movement to the assembly. As illustrated, the motor 28 is secured to the frame 24 by a mounting assembly 32. The eccentric weights 29 and 30 are mounted on opposite ends of the motor shaft which is disposed vertically. Rotation of the upper weight 29 induces horizontal vibration while rotation of the lower weight 30 induces vibration in the vertical and tangential planes. Vibration of the screen 27 causes material collected thereon to move from its center to its periphery. The characteristics of the screening process can be varied by adjusting both the size of the weights 29 and 30 and their relative angular position. The vibrational frequency corresponds to the motor speed. Normally, this type of separator uses a 1,200 or 1,800 rpm motor. The screen 27 secured to the interior of frame 24 is disposed generally in a horizontal plane. An opening 31 formed in the frame 24 above and adjacent the outer periphery of the screen 27 serves as an outlet for the materials collected on the screen 27. Underlying the screen 27 is a domed deck 35. Material passing through the screen 27 is collected on the deck 35 and is moved radially outwardly, discharging through peripheral opening 33 formed in a lower portion of the frame 24. The solids discharged through opening 31 are discarded through trough 34, and the slurry passing the screen 27 and opening 33 is discharged into system tank 20.

The second vibrating screen 12 can also include a spray system shown generally as 37. A spray ring 38 provided with a plurality of spray nozzles 39 is suspended within the frame 24 and in overlying relation to the screen 27. The liquid discharging from the spray nozzles 39 washes materials collected on the screen 27. The spray system 37 can be supplied with water or other wash liquid compatible with the type of drilling fluid being treated through connection 40 or, alternatively, with drilling fluid through connection 41.

Although the present invention has been described in connection with certain specific types of equipment, it should be observed that other types of equipment not specifically disclosed can also be used. Moreover, the invention can be used to treat any type of weighted drilling fluid. All that is necessary is that the average particle size of the weighting material be smaller than the average particle size of a portion of the drilled solids.

Regardless of the specific types of equipment used, the centrifugal separators, i.e. hydrocyclones, and the second vibrating screen 12 can be mounted as a unit on a suitable substructure designed to support these components as well as auxiliary equipment. Such a structure offers portability to the unit and permits the entire assembly to be set in overlying relation to a conventional drilling fluid tank such as tank 20 illustrated in FIG. 2.

In operation, a drilling fluid withdrawn from the well is passed through the first vibrating screen 10 and then is pumped by an auxiliary pump 36 through the hydrocyclones 11 connected in parallel. Under flowing conditions, the hydrocyclone nuts 22 are adjusted to provide a spray discharge of the underflow slurry. The volume of the underflow slurry normally will be less than about 10 percent of the total fluid introduced into the hydrocyclones 11. The low-density effluent from the hydrocyclones 11 is returned to the fluid system through header 18 and conduit 19. The underflow slurry collected in trough 23 gravitates into the second vibrating screen 12. The slurry is directed to the center of the screen 27. The small size particles and most of the liquid pass the screen 27 onto the domed deck 35 and finally through the deck discharge opening 33. Materials collected on the screen 27 are vibrated in a circular and radial direction towards the outer periphery of the screen 27 where they are collected and discharged through opening 31. These materials are discharged to waste. The flow capacity of the vibrating screen 12 and screening efficiency can be controlled by varying the vibration frequency, the number of weights, and the relative angular positions of the weights. These adjustments can be varied by trial-and-error until best performance is obtained.

Under operating conditions, the contents of tank 20 which receives the low-density effluent and the underflow from the screen separator 12 can be agitated to insure that the barite is uniformly dispersed in the fluid.

The following experiments illustrate the effectiveness of the method and apparatus of the present invention in the removal of drilled solids from a weighted drilling fluid. The apparatus used in the first test included 10 four-inch hydrocyclones and a four-foot vibrating screen. A 20 horsepower centrifugal pump delivered fluid to each of the hydrocyclones connected in parallel at a pressure of about 35 pounds per square inch. The vibrating screen used to screen the underflow slurry was manufactured by SWECO, Inc. and sold under the tradename Vibro-Energy Separator. The screen employed in the separator was a 120 tensile bolt cloth which, in mesh size, corresponds to 100 mesh of the U. S. Standard Sieve Series. An 1,800 rpm motor provided with upper and lower weights was used to vibrate the screen. During initial operation, the number of weights and angular positions of the weights were adjusted to provide best performance. The fluid used in the test was a bentonite water-base fluid containing barite and drilled solids and had the following properties:

| | |
|---|---|
| Plastic Viscosity | 11 centipoises |
| Yield Point | 12 pounds per 100 square feet |
| Density | 10.8 pounds per gallon |
| Total Solids | 15 volume percent |
| Particle Size Distribution of Total Solids | |
| 1–5 microns | 5 weight percent |
| 5–30 microns | 75 weight percent |
| 30–74 microns | 15 weight percent |
| > 74 microns | 5 weight percent |

Drilling fluid was introduced into the hydrocyclones at a total average rate of 383 gallons per minute and the underflow slurry from 5 of the hydrocyclones was processed through the vibrating screen. The volumetric flow rates of the hydrocyclone effluent, hydrocyclone underflow slurry, material screened out by the vibrating screen, and material passing the vibrating screen were periodically measured. Samples from each of these points were taken and analyzed.

The results of the test which lasted about 1 hour are summarized below. About 92 weight percent of the solids in the hydrocyclone effluent had a particle size smaller than 30 microns indicating that the hydrocyclones were performing satisfactorily. About 67 weight percent of the solids in the underflow slurry had a particle size in the 20–50 micron range with about equal amounts of particles greater and smaller than this range. The vibrating screen passed about 82 percent and discarded about 18 percent of the barite and passed about 44 percent and discarded about 56 percent of the drilled solids contained in the underflow slurry.

A second test was performed using the same apparatus modified to the extent that a spray system was installed to wash the particles collected on the vibrating screen. The spray system included six spray nozzles. Water was pumped to the spray system at a pressure of 19 pounds per square inch. The drilling fluid containing barite and drilled solids had the following properties:

| | |
|---|---|
| Plastic Viscosity | 16 centipoises |
| Yield Point | 12.5 pounds per 100 square feet |
| Density | 11.9 pounds per gallon |
| pH | 9.4 |
| Total Solids | 19.0 volume percent |

The drilling fluid was pumped into the ten hydrocyclones at a total average rate of 409 gallons per minute. The underflow slurry from five of the hydrocyclones was discharged into the vibrating screen. In this test, substantially all of the barite along with about 39 percent of the drilled solids contained in the hydrocyclone underflow slurry was recovered and about 61 percent of the drilled solids was discarded.

The solids control technique of the present invention was further tested under actual drilling conditions. A well in southern Louisiana was being drilled with a weighted, bentonite water-base drilling fluid having the following properties:

| | |
|---|---|
| Plastic Viscosity | 23 centipoises |
| Yield Point | 12 pounds per 100 square feet |
| Density | 10.0–10.5 pounds per gallon |
| pH | 10.8 |
| Total Solids | 11 volume percent |

The first vibrating screen was provided with the rig shale shaker which was a double-deck type having a 30 mesh top screen and a 50 mesh bottom screen.

A skid mounted unit consisting of 10 four-inch hydrocyclones and a vibrating screen was set in overlying relationship of a conventional drilling fluid tank used in the system. The vibrating screen was a four-foot, double-deck vibrating screen separator manufactured by SWECO, Inc. This vibrating screen is similar to that depicted in FIG. 2 and described above except that it includes two screening units arranged in stacked relation. Each screening unit is provided with a screen, an underlying domed deck, and separate outlets for discharging the screened out material and the throughput material. The top screen was a 230 tensile bolt cloth and the bottom screen was a 165 tensile bolt cloth. The 230 and 165 tensile bolt cloths have mesh sizes which correspond to 200 mesh and 140 mesh, respectively, on the U. S. Standard Sieve Series. A flow divider at the inlet of the vibrating screen directs input materials to each of the separating units. A water spray system was mounted above the top screen. The double-deck separator thus comprises two screening units connected in parallel. The screening units are mounted on the same base and vibration for the units is provided by an 1,800 rpm motor having upper and lower weights mounted on its shaft.

Drilling fluid having a density ranging between 10.0 and 10.5 pounds per gallon was flowed from the well through the rig shale shaker which removed large size drilled solids. The fluid was then pumped at well circulation rates through the hydrocyclones. The pump rate and pump pressure averaged about 360 gallons per minute and about 35 pounds per square inch, respectively. The hydrocyclones separated the fluid into a low-density effluent which was returned to the fluid system and a high-density underflow slurry. The underflow slurry was further processed through the vibrating screen. The volume of material discarded from each of the screening units of the vibrating screen was measured and the content of barite and drilled solids was determined. Materials discarded by the vibrating screen during the eight hour test period had the following average properties:

| | |
|---|---|
| Total Solids | 57 volume percent |
| Density | 16.9 pounds per gallon |

| | |
|---|---|
| Volume Percent Drilled Solids | 51 |
| Volume Percent Barite | 5.6 |

During the test, the amount of barite being discarded averaged 163 pounds per hour whereas the amount of drilled solids being discarded averaged 1,103 pounds per hour. The amount of barite being discarded represents less than 1 percent of the total barite being introduced into the hydrocyclones. During the early stages of the test, drilled solids discarded averaged 1,774 pounds per hour but as the solids content of the fluid was reduced by the treatment according to the present invention, the amount of drilled solids gradually decreased to a minimum of 686 pounds per hour.

The treatment of the drilling fluid by the method and apparatus of the present invention was continued for an additional 8 hours as the drilling fluid density was increased from 10.5 to 11.0 pounds per gallon by the addition of barite. During this phase of the test, the materials discarded by the vibrating screen had the following average properties:

| | |
|---|---|
| Total Solids | 51 volume percent |
| Density | 17.8 pounds per gallon |
| Drilled Solids | 35 volume percent |
| Barite | 16.7 volume percent |

During this test period, the amount of barite discarded averaged 285 pounds per hour whereas the amount of drilled solids discarded averaged 407 pounds per hour. During the final 2 hours of the test, the spray system pressure was increased from about 4 pounds per square inch to about 12 pounds per square inch. This reduced the barite content of the materials being discarded to 8.3 volume percent and the amount of barite being discarded to 238 pounds per hour.

The foregoing tests demonstrate that the method and apparatus of the present invention are capable of removing considerable amounts of drilled solids while recovering substantially all of the barite. Although the invention can be used to reduce the solids content of the drilling fluid as demonstrated by the above field tests, its main benefit will be realized when applied as a means for preventing the accumulation of drilled solids in the fluid. For this reason, the treatment of the drilling fluid by the present invention should be commenced during the early stages in which a weighted drilling fluid is used in the drilling operations and continued thereafter.

We claim:

1. A method for removing drilled solids from a drilling fluid being circulated in a well and containing drilled solids and a particulate weighting material denser and finer than at least a portion of the drilled solids, which comprises the steps of (a) passing said drilling fluid through a first vibrating screen sized to remove a portion of the drilled solids contained in said drilling fluid and to pass said weighting material; (b) centrifugally separating the drilling fluid passing said first vibrating screen into a low-density effluent and into an underflow slurry containing drilled solids and weighting material; (c) returning said effluent to the drilling fluid being circulated in said well; (d) screening said underflow slurry with a second vibrating screen sized to remove a portion of said drilled solids contained therein and to pass said particulate weighting material, said second vibrating screen being finer than said first vibrating screen; and (e) returning material passing said second vibrating screen to the drilling fluid being circulated in said well.

2. The method as defined in claim 1 wherein the step of centrifugally separating said drilling fluid is performed by a plurality of hydrocyclones connected in parallel.

3. The method as defined in claim 1 and further comprising the step of spray washing material collected on said second vibrating screen.

4. The method as defined in claim 1 wherein said first vibrating screen has a mesh size of 100 mesh or coarser on the U. S. Standard Sieve Series.

5. The method as defined in claim 2 wherein said second vibrating screen has a mesh size of 100 mesh or finer on the U. S. Standard Sieve Series.

6. A method for removing drilled solids from a drilling fluid containing barite and being circulated in a well which comprises the steps of (a) screening said drilling fluid with a first vibrating screen sized to separate a portion of the drilled solids and to pass said barite contained therein; (b) discarding said portion of drilled solids separated by said first vibrating screen; (c) centrifugally separating the drilling fluid passing said first vibrating screen into a low-density effluent and into a high-density underflow slurry containing barite and drilled solids; (d) returning said low-density effluent to the drilling fluid being circulated in said well; (e) screening said underflow slurry with a second vibrating screen sized to remove a portion of said drilled solids contained therein and to pass a major volume proportion of said barite contained therein; (f) discarding material collected on said second vibrating screen; and (g) returning material passing said second vibrating screen to the drilling fluid being circulated in said well.

7. The method as defined in claim 6 wherein said first vibrating screen has a mesh size between about 10 and about 100 mesh on the U. S. Standard Sieve Series.

8. The method as defined in claim 7 wherein said second vibrating screen has a mesh size between about 100 and about 325 mesh on the U. S. Standard Sieve Series.

9. A method of treating a drilling fluid being circulated in a well and containing barite and drilled solids, said method comprising the steps of (a) withdrawing drilling fluid from said well; (b) screening said drilling fluid withdrawn from said well with a first vibrating screen having an opening size no smaller than about 100 mesh on the U. S. Standard Sieve Series to remove drilled solids from the drilling fluid; (c) centrifugally separating the drilling fluid passing said first vibrating screen into a low-density effluent and into a high-density underflow slurry containing barite and drilled solids; (d) returning said effluent to said drilling fluid being circulated in said well; (e) screening said underflow slurry with a second vibrating screen having an opening size substantially smaller than that of said first vibrating screen to remove additional drilled solids from the underflow slurry, but sufficiently large to pass a major volume proportion of said barite contained in said underflow slurry; and (f) returning material passing said second vibrating screen to said drilling fluid being circulated in said well.

10. A method of treating a drilling fluid being used in well drilling operations and containing a particulate weighting material and drilled solids, the average particle size of said drilled solids being substantially larger than the average particle size of said weighting material, said method comprising the steps of (a) passing the drilling fluid through a first vibrating screen; (b) discarding material screened out on said first vibrating screen; (c) centrifugally separating the drilling fluid passing said first vibrating screen with a sufficient number of hydrocyclones to treat the drilling fluid at the fluid circulation rate, said hydrocyclones operating to separate the drilling fluid into a low-density effluent and into a high-density underflow slurry, said underflow slurry containing substantial quantities of said particulate weighting material and substantial quantities of said drilled solids; (d) returning said effluent to said drilling fluid being circulated in said well; (e) screening said underflow slurry with a second vibrating screen having an opening size substantially smaller than that of said first vibrating screen and being particularly sized to screen out a major volume proportion of said drilled solids and to pass a major volume proportion of said particulate weighting material contained in said underflow slurry; (f) discarding material screened out on said second vibrating screen; and (g) returning material passing said second vibrating screen to said drilling fluid being circulated in said well.

11. In a drilling fluid system including a surface container for containing drilling fluid and means for circulating said drilling fluid from the container through a well and back to the container, the improvement comprising: (a) a first vibrating screen having a mesh size no finer than about 100 mesh on the U. S. Standard Sieve Series; (b) centrifugal separating means; (c) means for passing the drilling fluid from said well through said first vibrating screen and then into said centrifugal separating means, said first vibrating screen being adapted to discard material collected thereon and said centrifugal separating means being adapted to separate the drilling fluid into an effluent stream and into an underflow slurry; (d) means for returning said effluent stream to the drilling fluid system; (e) a second vibrating screen having a mesh size substantially finer than that of said first vibrating screen but no finer than about 325 mesh on the U. S. Standard Sieve Series; (f) means for directing the underflow slurry into said second vibrating screen, said second vibrating screen being adapted to discard material collected thereon; and (g) means for returning material passing said second vibrating screen to said drilling fluid system.

12. The system as defined in claim 11 wherein said second vibrating screen has a mesh size between about 100 mesh and about 325 mesh on the U. S. Standard Sieve Series.

13. The system as defined in claim 11 wherein said centrifugal separating means includes a plurality of hydrocyclones connected in parallel.

14. The system as defined in claim 13 and further comprising means for spray washing material collected on said second vibrating screen.

15. A method of removing drilled solids from a drilling fluid that is being circulated in a well and which contains a particulate weighting material having an average particle size smaller than the particle size of a portion of the drilled solids, which comprises: (a) vibrationally screening said drilling fluid in a first screening stage to a first particle size fineness to remove part of said portion of drilled solids and to pass said weighting material and the remainder of the drilled solids; (b) centrifugally separating drilling fluid screened in step (a) into a low-density effluent, which is returned to the drilling fluid being circulated in said well, and a high-density underflow slurry containing particulate weighting material and drilled solids, and (c) vibrationally screening said underflow slurry in a second screening stage to a particle size finer than drilled solids removed in the first screening stage to remove additional particles in said portion of drilled solids from said underflow slurry and to pass and return to said drilling fluid being circulated in said well a major portion of the particulate weighting material contained in said underflow slurry.

16. A method as defined in claim 15 wherein the centrifugal separating step is performed on substantially all of the drilling fluid screened in step (a).

17. A method as defined in claim 16 wherein the centrifugally separating step separates the drilling fluid into a major fraction component comprising the low density effluent and a minor fraction component comprising the high density underflow slurry.

18. A method of removing drilled solids from a drilling fluid that is being circulated in a well and which contains a particulate weighting material having an average particle size smaller than the particle size of the drilled solids to be removed, which comprises: (a) vibrationally screening said drilling fluid in a first screening stage to remove large size drilled solids and to pass drilling fluid containing substantially all of said particulate weighting material and the remainder of said drilled solids; (b) centrifugally separating fluid passing said first screening stage into a low-density effluent, which is returned to the drilling fluid being circulated in said well, and a high-density underflow slurry containing particulate weighting material and drilled solids finer than the drilled solids removed in said first screening stage but coarser, at least in part, than the average particle size of said particulate weighting material contained in said underflow slurry; and (c) vibrationally screening said underflow slurry in a second screening stage finer than said first screening stage to remove additional drilled solids from said underflow slurry and to pass and return to said drilling fluid a major portion of the particulate weighting material contained in said underflow slurry.

19. A method as defined in claim 18 wherein the step of vibrationally screening said drilling fluid in the first screening stage is performed with a vibrating screen having a mesh size of 100 or coarser on the U. S. Standard Sieve Series.

20. A method as defined in claim 18 wherein the step of vibrationally screening said underflow slurry in the second screening stage is performed with a vibrating screen having a mesh size of 100 or finer on the U. S. Standard Sieve Series.

21. A method of treating a drilling fluid that is being circulated in a well and which contains drilled solids and particulate weighting material which comrises: (a) vibrationally screening substantially the entire stream of the drilling fluid discharging from said well to remove drilled solids substantially larger than said weighting material from said drilling fluid, (b) centrifugally separating substantially all of said drilling fluid screened in step (a) into a major fraction component comprising a low density effluent, which is returned to the drilling fluid being circulated in said well, and a minor fraction component comprising a high density underflow slurry containing particulate weighting material and drilled solids; and (c) vibrationally screening said underflow slurry to remove additional drilled solids from the underflow slurry which are finer than the drilled solids removed in step (a) but coarser than a major portion of the particulate weighting material contained in the underflow slurry, and to pass and return said major portion of the particulate weighting material to the drilling fluid being circulated in said well.

* * * * *